United States Patent [19]

White

[11] Patent Number: 4,801,563
[45] Date of Patent: Jan. 31, 1989

[54] THERMAL INSULATING EXPANDED SILICATE-HYDRATE PRODUCT AND METHOD OF FORMING

[76] Inventor: Eugene M. White, 1624 Franklin Ave., Fort Wayne, Ind. 46808

[21] Appl. No.: 913,109

[22] Filed: Sep. 26, 1986

[51] Int. Cl.$^4$ .................. C04B 38/00; C03C 11/00
[52] U.S. Cl. ........................................ 501/85; 501/39; 106/75
[58] Field of Search ............. 106/75; 501/39, 85; 252/62

[56] References Cited

U.S. PATENT DOCUMENTS

| | | | |
|---|---|---|---|
| 1,142,829 | 6/1915 | Maywald | 264/42 |
| 2,255,236 | 9/1941 | Willis | 501/39 |
| 2,691,248 | 10/1954 | Ford | 428/406 |
| 2,890,126 | 6/1959 | Ford | 501/39 |
| 3,151,966 | 10/1964 | Slayter | 65/22 |
| 3,261,894 | 7/1966 | Seidl | 264/43 |
| 3,268,350 | 8/1966 | Grebe et al. | 106/75 |
| 3,321,414 | 5/1967 | Vieli | 521/188 |
| 3,325,341 | 6/1967 | Shannon | 428/406 |
| 3,365,315 | 1/1968 | Beck et al. | 501/33 |
| 3,466,221 | 9/1969 | Sams et al. | 428/182 |
| 3,532,480 | 10/1970 | D'Eustachio | 65/20 |
| 3,743,601 | 7/1973 | Rao | 252/62 |
| 3,756,839 | 9/1973 | Rao | 106/75 |
| 3,844,804 | 10/1974 | Horai | 106/75 |
| 3,870,496 | 3/1975 | Cutler | 65/22 |
| 3,974,315 | 8/1976 | Murata | 252/62 |
| 4,059,425 | 11/1977 | Brydges, III et al. | 65/22 |
| 4,080,187 | 3/1978 | Parnell | 65/22 |
| 4,584,281 | 4/1986 | Foley | 106/75 |

FOREIGN PATENT DOCUMENTS

| | | | |
|---|---|---|---|
| 2112464 | 9/1971 | Fed. Rep. of Germany | 106/75 |
| 50-44217 | 4/1975 | Japan | 106/75 |
| 8300858 | 3/1983 | World Int. Prop. O. | 106/75 |

OTHER PUBLICATIONS

Glass Technology Developments Since 1978—Chemical Technology Review No. 184—J. I. Duffy, pp. 98, 99.
"Silicate Science" Wilhelm Eitel (1976), vol. VII—pp. 308-311 and Vol. VIII—pp. 19, 138-139 and 145, 146

Primary Examiner—William R. Dixon, Jr.
Assistant Examiner—Anthony J. Green
Attorney, Agent, or Firm—John F. Hoffman

[57] ABSTRACT

A thermal insulating material of an expanded, shell-less silica-hydrate has a small bubble structure to enhance the thermal insulating characteristics of the material. Also described is a process for the production of the expanded, shell-less silica-hydrate through selective heating of the silica-hydrate in a moist environment.

21 Claims, 1 Drawing Sheet

THERMAL INSULATING EXPANDED SILICATE-HYDRATE PRODUCT AND METHOD OF FORMING

BACKGROUND OF THE INVENTION

1. Field of the Invention

This invention relates to a thermally insulating product of a silica-hydrate material and the process for foaming this product. More specifically, this invention discloses a thermal insulating material of expanded silica expanded or foamed into discrete bubble structures, which bubbles agglomerate to define a macrospecimen having improved thermal insulating characteristics. These foams are rigid, fire-resistant and vermin resistant. The foamed or expanded material may be made into shapes such as sheet products, utilized as a loose fill or as a sprayed-on application for structural insulating components.

2. Prior Art

Expanded or foamed silica-hydrate products are known in the art. Many of these known foams were produced utilizing nucleating agents, glass crystals, binders, and preconditioning of the raw material such as by selection of particle size. The processes for the formation of such foamed material generally include the use of high temperatures, a requirement of an alkali silica-hydrate, or a dehydration stage. Rapid heating of the raw material produces a foam product that includes a shell-like material or crust about the foamed silica. The shell is formed by more rapid dehydration of the silica-hydrate particle surface than is experienced in the interior of the particle. In addition, indiscriminate rapid heating of the raw material foams the particle outer portion which insulates the internal particle against heat transfer and subsequent expansion.

The use of additives as nucleating or cellulating agents to enhance the foaming process has been disclosed, as well as the use of particle additives for strengthening of the foamed product.

U.S. Pat. No. 3,532,480—D'Eustachio teaches a process for the manufacture of a cellular glass. The process includes the use of a pulverized glass and a cellulating agent, which are formed into pellets or some other preprocessed shape. These preformed pellets are heated to an elevated temperature which adhere to each other and form a sheet of coalesced expanded pellets or nodules. The expanded or coalesced pellets are fed into a second heating chamber for further cellulation and formation of a sheet of multi-cellular glass. The preheating or pelletizing operation is conducted at a temperature between 1500° F. and 2200° F. The foaming or second step of the process is performed on a molten metal bath which is preferably tin or a tin alloy. However, it is noted that any molten state metal or alloy that will serve as a suitable heat exchange media without adherence to the molten glass may be utilized. In addition, an inert or reducing gas atmosphere is utilized to maintain a substantially non-oxidizing atmosphere above the surface of the molten metal bath.

U.S. Pat. No. 3,756,839—Rao discloses forming of an alkali metal silicate to produce rigid foams suitable for use as insulation, which foams have low solubility, low density and high compressive strength. Rao U.S. Pat. No. 3,756,839 taught the following: (1) that finer particle size appears to result in the production of smaller and more numerous gas bubbles which inferentially implies finer bubbles, thinner walls, and smaller diameter bubbles; (2) that slow heating tends to dehydrate the silica-hydrate resulting in reduced expansion efficiency unless heating is done under saturation conditions approaching 100% relative humidity; and (3) that a fixed sample would tend to foam on its outer portion thereby insulating the inner area from the heat source. This disclosure teaches the introduction of an exothermic metal powder as a nucleating agent to improve the foaming step by enhancing the volatilization of the water in the mixture and the uniforming of the foaming action. This patent particularly calls for the addition of the use of alkali metal silicate particles of a 1 to 400 micron range and the use of a finely divided metal powder in the range of 1 to 100 microns, which finely divided powder is to be utilized as centers for nucleation. The alkali metal silicate is hydrated and subsequently thermally foamed with the use of external energy. The forming utilizes water evolved at the nucleating site as the blowing agent. This patent particularly teaches away from the use of loose or loosely compacted materials and notes the probability of a nucleator, that is one of the small micron size particles, projecting through a cell, that is bubble wall, which could lead to faster permeation of heat through the cell wall or could provide a point location for wall breakdown and premature cell failure.

A cellulated silica with a uniform distribution of closed cells produced by heating silica in the presence of a carbonaceous cellulating agent is taught in U.S. Pat. No. 2,890,126. The mixture of silica and cellulating agent is heated to a sintering temperature for the silica particles. The temperature is further raised to react the entrapped or suspended cellulating agent with the silica to produce entrapped gases which expand to form closed cells of small but uniform size. Further, the silica and cellulating agent must be finely ground and intimately mixed, such as by blending in a ball mill. The operating temperatures for the sintering and elevated temperature operations are about 2600° F. and 2950° F., respectively. This is a high temperature operation utilizing a cellulating or nucleating agent to provide the gas bubble requisite for the production of a foamed silica material.

U.S. Pat. No. 3,365,315—Beck et all teaches the formation of glass bubbles through a process for the direct conversion of glass cullet particles into glass bubbles by heating. The particular glass bubbles of this disclosure are for an improved or elevated strength application particularly useful in molded parts for high pressure environments. Beck U.S. Pat. No. 3,365,315 also indicates such particles may be designed with thin walls and limited crushing strength. The glass bubble diameter may vary from a few microns, Beck suggests between 5 and 10 microns as the lower limit, up to approximately 100 or even 300 microns. The relative wall thickness of the glass balloon is indicated as being from a fraction of a micron up to approximately 10% of the diameter of a complete glass bubble, that is 20 microns thick. This is a high temperature process for a glass having a melting temperature between approximately 1200° C. and 1500° C. The raw material fusion process is performed in an oxidizing atmosphere. The fused glass particles are reheated under a neutral or reducing atmosphere for maximum glass bubble yield. The product is a bubble whose diameter is between 24 and 67 microns, which bubble has an average wall thickness of 1.8 microns with a range of 1.2 to 2.2 microns. This is a high temperature bath operation requiring quenching with a water spray and a recycle process to achieve the 24 to 67 micron range bubble.

U.S. Pat. No. 3,466,221—Sams et al discloses the reinforcement of a foamed alkali silicate with inorganic fibers such as asbestos fibers. The alkali silicate is expanded by the reaction of finely divided silicon with the silicate. The blend of silicon and slightly moist silicate is allowed to expand until set at an optimum expansion by the addition of sodium fluosilicate. This is essentially a low temperature operation wherein the operating temperature may be as high as 90° C. A microwave oven is used for product drying after formation of the foam.

U.S. Pat. No. 3,151,966—Slayter discloses a glass foam and the formation thereof. The desirability of a foam glass insulation with an apparent density below about 3 pounds per cubic foot and maintenance of individual, unconnected bubble units such that the foaming gas enhances the insulating characteristics of the glass foam is noted. The broad process steps of this particular patent teach the preparation of a melt at the range of 2460° F. to 2550° F. under oxidizing conditions; the bubbling of a heavy gas (e.g. sulfur dioxide) through the glass melt until fully saturated; thereafter, cooling and exposing the melt to shortwave radiation for crystal nucleation; reheating the melt to about 970° F. for further rapid crystal nucleation; and, thereafter heating the glass above its softening point for crystal formation therein. This crystal forming temperature can be as low as 1200° F. This again is a high temperature operation utilizing radiation or microwave energy only for brief periods after elevated temperature operations. The radiated melt temperature is elevated to a higher temperature. The product has multiphase glass structure in the walls of the bubbles or cells, and the process requires a nucleating agent and crystal formation above 1200° F. There is some indication of a glass matrix with crystals embedded therein, which may be indicative of a shell or crust like structure inherent in these foam silicate products.

U.S. Pat. No. 3,743,601—Rao teaches the production of a microcellular inorganic silicate foam for building construction. The process includes steps of hydrating finely divided particulate silicates with water and thereafter expanding the mass by input of thermal energy. The heat energy may be provided by conventional heat sources, a microwave energy source or the dissipation of mechanical energy within the material. The hydrated material includes a solid alkali metal silicate and the hydrated water acts as the foaming agent. A further embodiment of the process includes the use of superatmospheric pressure as a process requirement. The resultant product of this material can provide a product with an R-rating up to R-5, however, the density ranges between 2 and 8 pounds per cubic foot.

U.S. Pat. No. 3,870,496—Cutler discloses a method for the production of a foam glass from materials such as waste glass. The glass is modified with hydroxide group materials and heated to the softening range of the glass composition to release the hydroxide, thereby foaming the glass. Water vapor is trapped in the stiffened glass forming a stiffened cellular product. Indicative of this reaction is the experiment wherein glass beads were hydrated in an autoclave with a saturated water vapor atmoshpere at 390° C. and 1090 psi. The modified glass was treated in a furnace at approximately 1100° C. to foam the material as well as partially sintering the foamed glass sample. Sintering would lead to a continuum on the surface of the foamed glass. Finely ground glass, that is finely divided particles, is required for an autoclaving process necessary to saturate the glass structure with hydroxide ions and the subsequent passage through a furnace for foaming.

A process for the production of a foamed alkali metal silicate is taught in U.S. Pat. No. 4,080,187—Parnell. The basic process includes the following steps: (1) hydration of an anhydrous glass composition form among the group of alkali metal glasses; (2) dehydration of the hydrated glass by about 50%; (3) rehydrating the glass foamed particles to an the integral mass without collapse thereof; and (4) dehydrating the integral mass to foam the silica-hydrate. Step 3 of the process is performed at or below 250° C. but above 100° C. A metal oxide is added to aid in reducing the surface tension of the glass melt.

U.S. Pat. No. 4,059,425 to Brydges, III et al, discloses a process and apparatus for steam hydrating alkali silicate glass and subsequently extruding the hydrated material as a foam extrusion. The treatment temperature although it can be up to 600° C. will not generally exceed the softening point of the anhydrous glass.

The above-noted disclosure either taken together or individually do not disclose a thermal insulating product of an expanded, shell-less silica-hydrate. The foamed or expanded silica-hydrate is produced by the selective heating of silica-hydrate particles in a moisture enhanced environment by radiated energy at a predetermined frequency or may be accomplished in a media at a specific temperature range below the melting or liquid state of the silica-hydrate.

SUMMARY OF THE INVENTION

A thermally insulating product of an expanded, shell-less silica-hydrate with a bubble composition, which is an agglomeration of generally spherical bubble components with a mean diameter of less than 7.0 microns. The bubble walls are comprised of smaller bubble agglomerations which smaller bubbles have a wall thickness in the range of 0.005 to about 2.0 microns and a void therein. The production process for this product includes heating the starting material by radiation at wavelengths selectively highly absorbed by the silica.

DESCRIPTION OF THE DRAWING

In the FIGS. of the drawings, like reference numerals refer to like components and in the drawing.

DETAILED DESCRIPTION OF THE INVENTION

Figure 1:
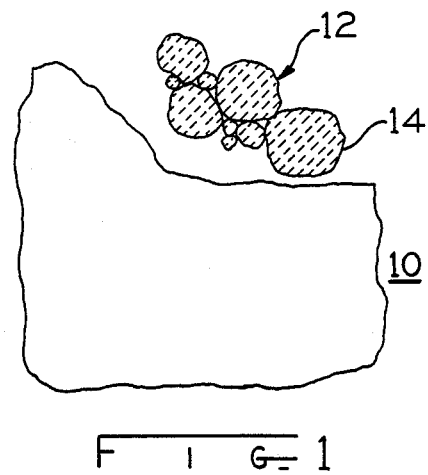
FIG. 1 illustrates a schematic plan view in partial cross-section of a globule of the expanded composited silica-hydrate material.
Figure 2:
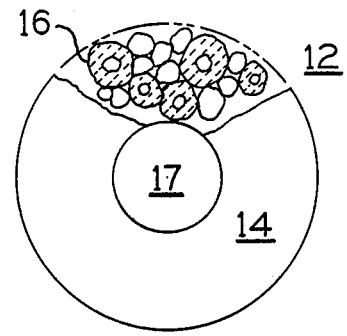
FIG. 2 illustrates a schematic cross-sectional view of a bubble of the globule structure in FIG. 1.
Figure 3:
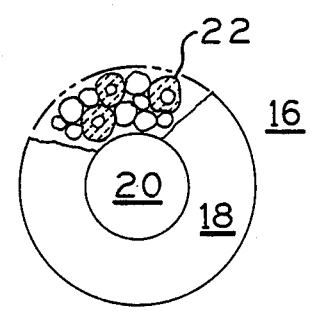
FIG. 3 is a schematic, enlarged cross-sectional view of a microbubble component of the bubble wall of FIG. 2.
Figure 4:
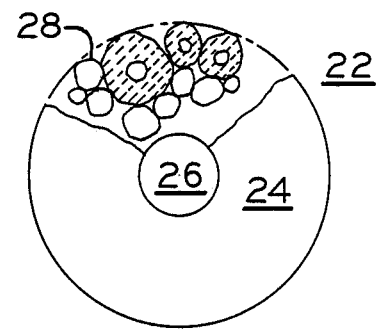
FIG. 4 is a schematic, enlarged cross-sectional view of a submicrobubble component of the wall of the microbubble in FIG. 3.

A thermally insulating, expanded silica-hydrate product 10 is schematically illustrated in FIGS. 1 through 3. In FIG. 1 a globule 10 of the expanded silica-hydrate is illustrated in a generally spherical shape. The spherical shape is illustrative, not a limitation, as the basic product is not necessarily uniform in size or shape. Globule 10 is broadly comprised of an agglomeration of bubbles or bubble components 12 shown in FIGS. 2 to 4 and glass-silicate therebetween.

Bubbles 12 with a wall 14 are also shown as spherically shaped for illustration although they may have other arcuate shapes. Wall 14 of bubble 12 is an agglomeration of microbubbles 16 and the glass-silicate between such microbubbles of wall 14. Wall 14 of bubble 12 defines a void 17 depicted as generally centrally located within bubble 12.

Microbubble 16, shown in partial cross-section in FIG. 3, is bubble-shaped and has a wall 18 defining a second void or cavity 20. Wall 18 is comprised of an agglomeration of submicrobubbles 22 with a glass-silicate matrix therebetween. Submicrobubble 22, shown in FIG. 4 as a sphere in partial cross-section for illustrative purposes, has a wall 24 with a void 26. Wall 24 is a nonuniform structure of expanded silicate-hydrate that may include particulate matter such as unreacted silica-hydrate 28 and a media accumulated during foaming of the silica-hydrate. The included material in the wall is not a requisite but is provided as exemplary.

Figure 5:
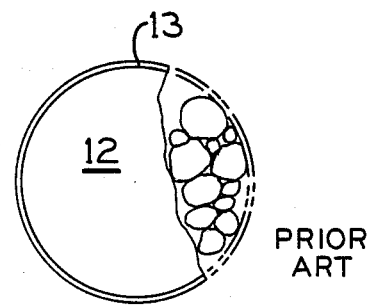
FIG. 5 is a schematic cross-sectional view of a known prior art bubble of a foamed silica which includes a shell.

Expanded foams of silica or silica-hydrate generally have previously been produced in accordance with the prior art with a shell 13 encapsulating bubble 12 as shown in FIG. 5. Shell 13 is detrimental to the insulating characteristics of the foamed product.

The bubble structures 12, 16 and 22 are non-uniform in size and shape, however, measurements have indicated a mean bubble diameter of less than 7.0 microns. This is indicative of a smaller bubble size which is a desired characteristic for an improved thermal insulating product. The measured bubble sizes ranged from approximately 1.0 millimeter to approximately 0.1 micron, with an average diameter less than 1.0 millimeter. Bubble structures 12 and 16 may share a common wall and similarly such shared bubble walls may also occur in gobule 10. Wall thickness of the bubble 12, 16 or 22 were measured between 2.0 and 0.005 microns.

The globules 10, bubbles 12, microbubbles 16 and submicrobubbles 22 are the product of a foaming operation of a silica-hydrate material, which hydrate may be any form of silicate such as quartz, perlite or an alkali metal silica-hydrate. The raw material is introduced to a reaction apparatus or vessel for selected rapid heating of the siliceous material, which rapid heating avoids the frequencies of absorption of free water.

The silica-hydrate is heated by the selective utilization of energy at the frequency (wavelength) of the water bond on the silica surface. Further, the silica absorbs energy at a selected frequency (wavelength) which provides heat for the ebullition of water molecules at the silica surface. The silica particles thus becomes a bubble nucleating site, which provides more numerous and smaller bubbles with thinner walls. Heating of the silica particles and ebullition of the hydrate bonded to the silica results from the selected radiant heating. In addition, any free moisture (not bonded) evolved at the surface of the silica-hydrate particles is produced at a nucleation site thereon.

In the process for the production of the foamed product, it is preferable to maintain the moisture content or partial water pressure of the reaction environment as high as possible during the foaming stage. The reaction environment includes, for example, the furnace atmosphere above and in a fluidized bath or bed, or the moisture concentration in the particulate mixture emanating from a spray nozzle. The silica-hydrate temperature is increased until it is at a plastic-like state, but below its liquidus temperature. The operating temperature for this plastic-like state is approximately in the range of 900° F. to 1100° F. This temperature must be maintained only until the raw material has foamed. The silicate is not preheated in a dry atmosphere, but may be preheated in a moist atmosphere. Any furnace or reaction means suitable to perform the heating function at the desired wavelengths is acceptable. This process will tolerate any particle size although a smaller, such as less than one-quarter inch, particle size is preferred. The hydrate-silica bond ruptures in a dry atmosphere at approximately 500° C.

Figure 6:
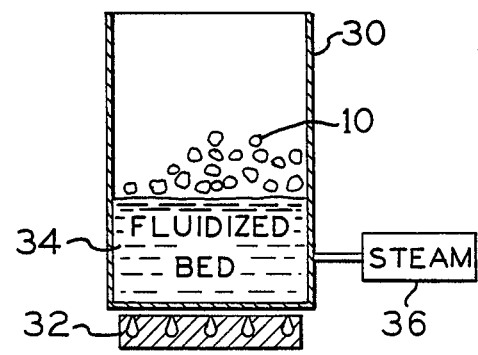
FIG. 6 is a schematic diagram of a fluidized bed furnace for the production of the expanded silica-hydrate material.

FIG. 6 illustrates schematically a fluidized bed furnace or reaction apparatus 30 which is heated or provided energy from energy source 32. The fluidized bed 34 may be, for example, a quartz sand with a silica hydrate material blended therein. Alternatively, the fluid bed media may be, for example, a ground glass or a powdered silica. Steam from a steam source 36 is communicated to fluidized bed 34 and is heated along with the fluid bed to provide a moist reaction environment both in and above the fluidized bed 34. As an example, expanded silica-hydrate may be produced in such a fluid bed by the following process steps: (1) provide a reaction apparatus and a quartz sand bath therein; (2) elevate the quartz sand bath to a temperature between 900° to 1100° F.; (3) provide steam flow through the quartz bath (a fluidized bed); (4) mix a sodium silica-hydrate raw material in the quartz sand bath; and (5)—collect the spontaneously foamed product. In the example, steam vapor was continuously purged through the silica quartz bath. The vapor pressure above the bath was less than 5 psi above atmospheric pressure. The silica-hydrate material attained a soft or malleable state and the foaming was spontaneous. The foaming silica-hydrate material was collected as it expanded from the bath and kiln environment. The foamed product as it expands from the reaction vessel may be collected and composited into a sheet material of a predetermined thickness rather than retained in its loose-fill form.

Test results for the above-noted fluidized-bed, steam purged method are reported in Table I. Equipment problems in two initial tests resulted in aborted experiments.

TEST RESULTS

TABLE I

| Sample No. | Percentage by weight Water Removed (%) | Reaction Temperature (°F.) | Relative Humidity Above Material (%) | R (Thermal Conductivity) (BTU-IN/HR/sq. ft./°F.) | Density (lb./cu. ft.) |
| --- | --- | --- | --- | --- | --- |
| 1 | 34.5 | 900–1100 | 100 | 6.01 | Not Measured |
| 2 | — | 900–1100 | 100 | 6.5 | Not Measured |
| 3 | — | 900–1100 | 100 | 6.77 | Not Measured |
| 4 | Furnace Failure | | | | |
| 5 | — | 900–1100 | 100 | 6.90 | 3.09 |

The raw material was a sodium silica-hydrate material nominated JM water glass by the manufacturer, DuPont Co., which water glass has a $SiO_2:Na_2O$ ratio of 3.25. The mixed silica-hydrate and quartz sand bath temperature was elevated to between 900°–1100° F. Selective heating was provided by radiant energy from the quartz which included water vapor reacting with the hot sand and radiating energy at wave lengths distinctive to the hydrate-silica bond.

The R-value results in Table I were determined by measurement of the thermal conductivity according to the American Society for Testing Materials (ASTM) specification C-335 with a double-guarded hot plate. R-values reported in Table I are the inverse of the thermal conductivity measured in ASTM Test C-335. The improved insulating results reported in later tests are indicative of improved technique. The tests resulted in a product at the theoretically desired density range of 3.0 lbs./cu.ft. noted in the cited references.

Earlier furnace tests were conducted without maintenance of the vapor pressure in and above the reaction mixture. Products from those tests, in many cases, were low density as much of the material evolved as dust during foaming. The overall dried or dry-atmosphere foam product was considered a less desirable product as indicated by an R-value less than 4.0. The R-value results in Table II were determined by measurement of the thermal conductivity acording to ASTM specification C-177. There were two R-value exceptions (sample Nos. 23 and 25 in Table II below) in these earlier tests. However, water vapor (steam) was provided to the reaction vessel during those tests.

The earlier tests are reported in Table II. As the water vapor increased in the bath and reaction vessel, the R-value also improved. Equipment failures are also reported and where possible expanded silicate product, if any, from such tests was evaluated.

TEST RESULTS

TABLE II

| Sample No. | Change in by Weight Moisture Content Between Foamed Product and Raw Material (%) | Reaction Temperature (°F.) | Relative Humidity Above Material (%) | R [(Thermal Conductivity (BTU-IN/HR/sq. ft./°F.)]$^{-1}$ | Density (lb./cu. ft.) |
| --- | --- | --- | --- | --- | --- |
| 6 | 31.5 | | | 2.61 | 2.88 |
| 7 | | 525 | | | 2.16 |
| 8 | 24 | 500 | | 3.39 | |
| 9 | 11.4 | | | 2.52 | |
| 10 | 8.75–12 | | | 2.56 | 1.55 |
| 11 | 7.5 | 240 | | 2.52 | 3.20 |
| 12 | 8 | 240 | | 2.09 | 2.76 |
| 13 | 6.3–7.9 | 500 | 31 | 2.91 | 1.15 |
| 14 | 5.5 | 600 | | | 0.62(Dust) |
| 15 | 8.6–9.75 | 600 | | 2.52 | 1.9 |
| 16 | 9.2 | 600 | | 3.03 | 1.9 |
| 17 | 25.9 | 600 | | 3.59 | |
| 18 | 14 | | | 3.98 | |
| 19 | 5.4–8.7 | 1200–1300 | 50 | 2.70 | |
| 20 | | 1200–1300 | | 3.78 | |
| 21 | 20 | 1000–1100 | | 2.81 | 2.6 |
| 22 | 36.8 | 1000–1100 | | 3.03 | |
| 23 | 30 | 1000–1100 | * | 4.71 | |
| 24 | Liquid | 1000–1100 | * | 3.296 | Sand Adhered to Product |
| 25 | 35.9 | 1000–1100 | * | 5.35 | |

*Steam surrounding reaction vessel.

The tests reported in Tables I and II clearly indicate the improvement in the product quality at the controlled temperature range and with water vapor maintenance. A vapor pressure above the bath is preferred at less than 5 psi above atmospheric pressure. In the examples 9 through 16, the raw material was predried. Samples 11 and 12 were tests performed on raw material from the same batch which were expanded at the same relative humidity. Sample 11 was reacted in a silica media, whereas sample 12 as heated in an iron environment. The silica-media reaction environment produced a foamed material with an R-value approximately twenty-five percent greater than that of the iron. This is indicative of improved product quality for expanded silicate from a silica-based environment.

Silica-hydrate in a water-saturated reaction environment may be heated by radiated energy from a source, such as an electronic wave. The output wavelength may be selected from the family of wavelengths such as in the framework vibration bands near 464 $cm^{-1}$, 1100 $cm^{-1}$ or 950 $cm^{-1}$. The latter two bands are major absorption peaks of sodium silica glasses. Hydrate bonds on silica-hydrate are characterized by a family of wavelengths including those wavelengths at 3.35 to 3.85 and 4.25 microns. A discussion of these characteristics is provided in *Silicate Science*—William Eitel, Volume VII, at page 308 and Volume VIII at page 139.

The raw material for the process may be any silica-hydrate, including the alkali metal silica-hydrates. It is preferred that these reactions proceed in a non-water-absorbing environment such as a molten tin bath, moisture-saturated-atmosphere or silica oil bath wherein the reaction products do not react with the environmental medium.

Those skilled in the art will recognize that certain variations can be made in the illustrated embodiments. While only specific embodiments of the invention have been described and shown, it is apparent that various alterations and modifications can be made therein. It is, therefore, the intention in the appended claims to cover all such modifications and alterations as may fall within the true scope and spirit of the invention.

What is claimed is:

1. A thermal insulating material comprising a plurality of substantially spherical bubbles forming an agglomeration, each said bubble being of expanded silica and having an outer generally spherical wall that consists substantially of a plurality of microbubbles, said microbubbles forming a hollow spherical agglomeration to thereby form said spherical bubble.

2. A thermal insulating material as claimed in claim 1 wherein said insulating material has a thermal conductivity less than 0.30 BTU-in./hr/sq.ft./°F.

3. A thermal insulating material as claimed in claim 1 which material has an R-value greater than 5.0.

4. The material of claim 1 wherein said wall has a thickness in the range of about 0.005 to about 2.0 microns.

5. A process for expanding silica-hydrate to make thermal insulating material comprising the steps of: introducing into a reaction apparatus a silica-hydrate material, rapidly heating the material by irradiating the silica-hydrate material with radiation at one or more wavelengths that are selectively highly absorbed by the silica and excluding wavelengths that are highly absorbed by free water.

6. The process of claim 5 wherein the step of heating includes irradiating the silica-hydrate at a wavelength highly absorbed by the water-silica bond of the silica-hydrate.

7. The process of claim 5 wherein the step of heating includes irradiating the silica-hydrate at a wavelength highly absorbed by the hydrate bound to silica.

8. The process of claim 5 wherein the step irradiating comprises irradiating the silica hydrate material by radiation generated by an electronic wave generator.

9. The process of expanding silica-hydrate as claimed in claim 5 and further comprising elevating the temperature of said silica-hydrate material in said reaction apparatus until the material is in a soft state.

10. The process of expanding said silica-hydrate as claimed in claim 9 wherein the temperature of said silica-hydrate is elevated to a temperature in the range of 900° to 1100° F.

11. The process of expanding silica-hydrate as claimed in claim 5 wherein said reaction apparatus is a kiln.

12. The process of expanding silica-hydrate as claimed in claim 5 wherein there is a fluidized bed in said reaction apparatus with a quartz media, continuously purging said fluidized bed with steam and maintaining the vapor pressure above said fluidized bed less than 5.0 psig.

13. The process of expanding silica-hydrate as claimed in claim 5 wherein said silica-hydrate is an alkali silica-hydrate.

14. The process of foaming a silica-hydrate material as claimed in claim 5 wherein said wavelengths are in the silica vibration band at about 464 cm$^{-1}$.

15. The process of foaming a silica-hydrate material as claimed in claim 5 wherein said wavelengths are in the silica vibration band at about 1100 cm$^{-1}$.

16. The process of foaming a silica-hydrate material as claimed in claim 5 wherein said wavelengths are in the silica vibration band at about 950 cm$^{-1}$.

17. The process of foaming a silica-hydrate material as claimed in claim 5 wherein said reaction apparatus includes a quartz sand bath at a temperature in the range of 212° F. to 1300° F.

18. The process of foaming a silica-hydrate material as claimed in claim 5 wherein said silicate-hydrate defines a particle surface for nucleating moisture ebullition, which nucleating action defines nucleation sites at the particle surface.

19. A thermal insulating material comprising a plurality of substantially spherical bubbles forming an agglomeration, each said bubble being of expanded silica and having an outer generally spherical wall that comprises a plurality of microbubbles, said microbubbles forming a hollow spherical agglomeration to thereby form said spherical bubble, said microbubbles being of expanded silica and having an outer wall that comprises a plurality of submicrobubbles.

20. A thermally insulating material comprising an agglomeration of primary bubbles of expanded silica, said bubbles each having an outer wall that consists almost entirely of a plurality of contiguous microbubbles of expanded silica, said microbubbles forming a hollow agglomeration to thereby form said primary bubble.

21. The insulating material of claim 20 wherein said microbubbles have outer walls that comprise a plurality of contiguous submicrobubbles.

* * * * *